United States Patent
Tang

(10) Patent No.: US 9,680,912 B2
(45) Date of Patent: Jun. 13, 2017

(54) METHOD AND APPARATUS FOR LOADING RESOURCE FILES OF AN APPLICATION

(71) Applicant: Tencent Technology (Shenzhen) Company Limited, Shenzhen (CN)

(72) Inventor: Shengfu Tang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 545 days.

(21) Appl. No.: 14/261,007

(22) Filed: Apr. 24, 2014

(65) Prior Publication Data

US 2014/0237026 A1    Aug. 21, 2014

Related U.S. Application Data

(63) Continuation of application No. PCT/CN2013/089062, filed on Dec. 11, 2013.

(30) Foreign Application Priority Data

Dec. 11, 2012  (CN) .......................... 2012 1 0531509

(51) Int. Cl.
  *G06F 15/16* (2006.01)
  *H04L 29/08* (2006.01)
  (Continued)

(52) U.S. Cl.
  CPC ............... *H04L 67/06* (2013.01); *G06F 8/67* (2013.01); *H04L 67/42* (2013.01)

(58) Field of Classification Search
  CPC .................. H04L 67/06; H04L 67/42
  (Continued)

(56) References Cited

U.S. PATENT DOCUMENTS 6,345,308 B1 * 2/2002 Abe .................. H04L 29/06
                                                707/999.101
2008/0192643 A1 * 8/2008 Bae .................... H04L 43/0817
                                                370/252

(Continued)

FOREIGN PATENT DOCUMENTS

CN        1885823 A      12/2006
CN      101206657 A       6/2008
(Continued)

OTHER PUBLICATIONS

Tencent Technology, ISRWO, PCT/CN2013/089062, Mar. 6, 2014, 7 pgs.

(Continued)

*Primary Examiner* — Karen Tang
(74) *Attorney, Agent, or Firm* — Morgan, Lewis & Bockius LLP

(57) ABSTRACT

A method at a client device includes: presenting content to a user; detecting behavior of the user with respect to the content; if the detected behavior meets one or more predefined criteria, downloading a first plurality of resources, where the first plurality of resources is at least a subset of resources specified in a resources list; if the detected behavior does not meet the predefined criteria, downloading a second plurality of resources, where the second plurality of resources is randomly selected from the resources specified in the resources list; receiving a user input selecting an online application; and in accordance with the user input selecting the online application, loading respective downloaded resources that correspond to the selected online application.

15 Claims, 9 Drawing Sheets

(51) Int. Cl.
*H04L 29/06* (2006.01)
*G06F 9/445* (2006.01)

(58) Field of Classification Search
USPC .................................................. 70/217, 219
See application file for complete search history.

(56) References Cited

U.S. PATENT DOCUMENTS

| | | | | |
|---|---|---|---|---|
| 2012/0042076 | A1* | 2/2012 | Kawa .................... | G06F 9/50 709/226 |
| 2012/0317565 | A1* | 12/2012 | Carrara .................. | G06F 8/61 717/178 |
| 2013/0311985 | A1* | 11/2013 | Aleksandrov ........... | G06F 8/65 717/173 |

FOREIGN PATENT DOCUMENTS

| | | |
|---|---|---|
| CN | 102065108 A | 5/2011 |
| CN | 102255866 A | 11/2011 |
| CN | 102737037 A | 10/2012 |

OTHER PUBLICATIONS

Tencent Technology, IPRP, PCT/CN2013/089062, Jun. 16, 2015, 5 pgs.

* cited by examiner

METHOD AND APPARATUS FOR LOADING RESOURCE FILES OF AN APPLICATION

RELATED APPLICATIONS

This application is a continuation application of PCT Patent Application No. PCT/CN2013/089062, entitled "METHOD AND APPARATUS FOR LOADING RESOURCE FILES OF AN APPLICATION" filed Dec. 11, 2013, which claims priority to Chinese Patent Application No. 201210531509.X, titled "METHOD AND APPARATUS FOR LOADING RESOURCE FILES OF AN APPLICATION," filed Dec. 11, 2012, both of which are hereby incorporated by reference in their entirety.

FIELD OF THE INVENTION

The present application relates to the field of Internet technologies, and in particular, to a method and a loading apparatus for loading resource files of an application.

BACKGROUND

With development and popularization of the Internet, the network online application has gradually become one of the main applications of the Internet, and more and more Internet users use the network online application.

The network online application enables multiple users to simultaneously perform a multiplayer information interaction operation online, the users generally need to use some resource files (for example, pictures) in the network online application, when the users initiate a download application for the first time, the system will store the resource files that the users need to download into a web browser cache, when the users reinitiate a download application, the system may first check whether the resource files that the users need to download are in the cache, if they are in the cache, the system may automatically call the required resource files from the cache, and if they are not in the cache, the system performs download again and stores the downloaded resource files in the cache, and then calls the resource files from the cache for use.

With rapid development of the network online application, the capacity and quantity of the resource files that the application needs to use are more and more, and when the application is run, it is necessary to download a large number of resource files; however, in the existing download solution, the application is run while the resource files required by the application are being downloaded, and thus when it is necessary to download lots of resource files, it will affect the running speed at which the user runs the application online, thereby finally reducing the user experience.

SUMMARY

In accordance with some embodiments, a method at a client device includes: presenting content to a user; detecting behavior of the user with respect to the content; if the detected behavior meets one or more predefined criteria, downloading a first plurality of resources, wherein the first plurality of resources is at least a subset of resources specified in a resources list; if the detected behavior does not meet the predefined criteria, downloading a second plurality of resources, wherein the second plurality of resources is randomly selected from the resources specified in the resources list; receiving a user input selecting an online application; and in accordance with the user input selecting the online application, loading respective downloaded resources that correspond to the selected online application.

In accordance with some embodiments, a client device includes a display, memory, one or more processors, and one or more programs, wherein the one or more programs are stored in the memory and configured to be executed by the one or more processors. The one or more programs including instructions for: presenting content to a user; detecting behavior of the user with respect to the content; if the detected behavior meets one or more predefined criteria, downloading a first plurality of resources, wherein the first plurality of resources is at least a subset of resources specified in a resources list; if the detected behavior does not meet the predefined criteria, downloading a second plurality of resources, wherein the second plurality of resources is randomly selected from the resources specified in the resources list; receiving a user input selecting an online application; and in accordance with the user input selecting the online application, loading respective downloaded resources that correspond to the selected online application.

A non-transitory computer readable storage medium storing one or more programs, the one or more programs comprising instructions, which when executed by a server, cause the device to: present content to a user; detect behavior of the user with respect to the content; if the detected behavior meets one or more predefined criteria, download a first plurality of resources, wherein the first plurality of resources is at least a subset of resources specified in a resources list; if the detected behavior does not meet the predefined criteria, download a second plurality of resources, wherein the second plurality of resources is randomly selected from the resources specified in the resources list; receive a user input selecting an online application; and in accordance with the user input selecting the online application, load respective downloaded resources that correspond to the selected online application.

BRIEF DESCRIPTION OF DRAWINGS

To illustrate the technical solutions according to the embodiments of the present application more clearly, the accompanying drawings for describing the embodiments or the prior art are introduced briefly in the following. Apparently, the accompanying drawings in the following description are only some embodiments of the present application; persons of ordinary skill in the art can obtain other drawings according to the accompanying drawings without paying any creative efforts.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Embodiments of the present application are described below in detail with reference to the accompanying drawings.

Figure 1:
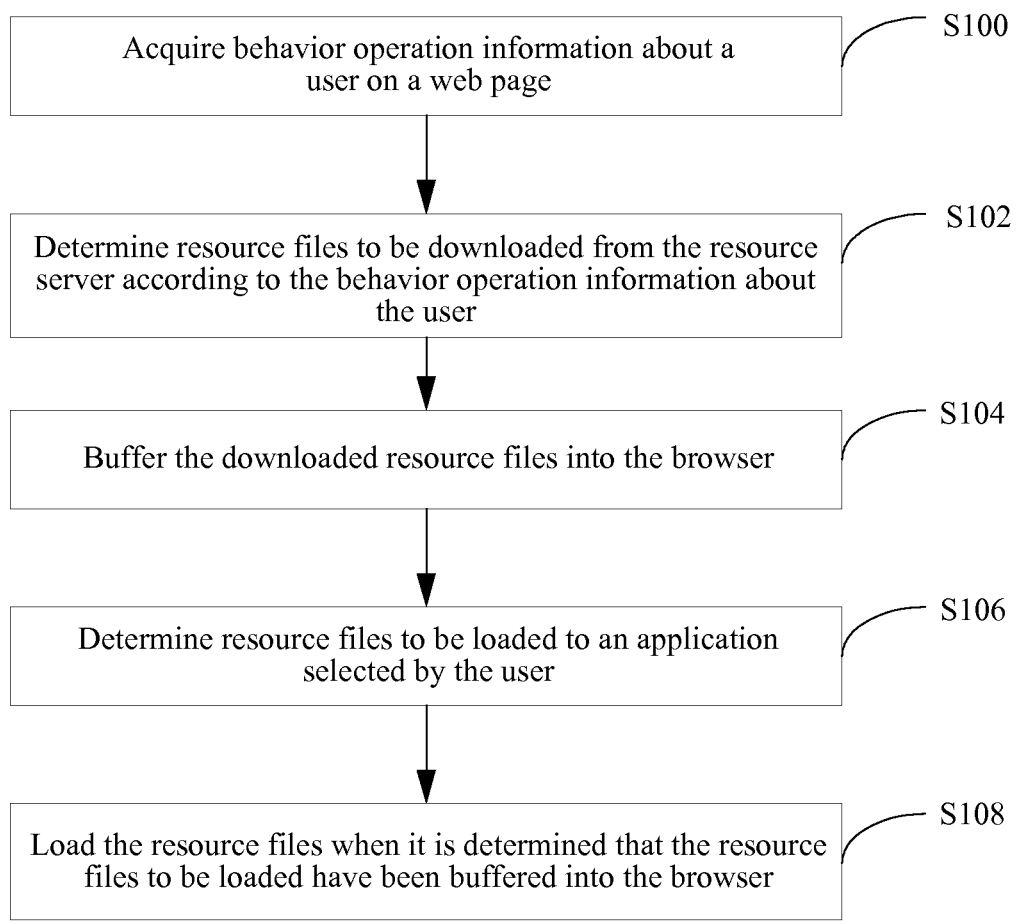
FIG. 1 is an overall flow chart of a method for loading resources files of an application according to some embodiments of the present application.

FIG. 1 is an overall flow chart of a method for loading resources files of an application according to some embodiments of the present application.

In this embodiment, a user logs on to a web page through a web browser in a mobile terminal, and to browse a variety of information in the web page, such as information and various network online applications. In this embodiment, the network online applications may include, but are not limited to, web games, web online chat and so on. After the user selects a certain network online application, he can directly run the selected network online application in the browser. In this embodiment, before the user selects a certain network online application, the browser may determine, according to behavior operation information about the user on the web page, whether the user is interested in selecting certain network online applications, or determine whether the user understands information about a certain network online application, or determine whether the user is logging on to a certain network online application. Then, pre-download resource files of the network online application according to a list of downloaded resources provided by a resource server, and after the user selects a certain network online application, load the pre-downloaded resource files of the network online application.

In this embodiment, in step S100, acquire behavior operation information about a user on a web page. In this embodiment, when the user accesses a web page through a browser, the behavior operation information may include, but is not limited to, residence time of the user on the web page, and the number of user's access to the web page. In this embodiment, when a new user or an old user accesses a certain web page, if he is interested in a certain network online application, the user may spend some time on the web page in understanding the network online application, or he may constantly access the web page or network online application; or when the old user accesses a certain web page, he may log on to a certain network online application in the form of inputting account number and password, and the old user needs to spend some time in completing the login operation process.

In step S102, determine resource files to be downloaded from the resource server according to the behavior operation information about the user, and download the resource files. In this embodiment, when the browser runs the network online application, it is necessary to load resource files included therein, and upon success of the loading, normal running of the network online application can be ensured.

In this embodiment, the browser may first acquire a list of downloaded resources from the resource server, then, determine resource files to be downloaded in the list of resources according to the behavior operation information about the user, and download the resource files. In this embodiment, the list of downloaded resources include, but is not limited to, resource files of all network online applications, or resource files of some network online applications.

In step S104, buffer the downloaded resource files into the browser. In this embodiment, when the user has not completed selection of a network online application, he can pre-download a network online application into the browser after performing steps S100 to S104.

In step S106, determine resource files to be loaded to a network online application selected by the user. In this embodiment, when the user is interested in a certain network online application or logs on to a certain network online application, the user may select the network online application, and at this time, the browser may detect the user's operation instruction for the selected network online application, for example, click a certain network online application or log on to a certain network online application. When the browser detects the user's operation instruction for the selected network online application, it can be determined that the user selects the network online application, and at this time, resource files to be loaded to the network online application are also determined.

In step S108, load the resource files when it is determined that the resource files to be loaded have been buffered into the browser.

With the technical solution provided in this embodiment of the present application, when a user does not select a network online application, pre-download required resource files from a resource server according to behavior operation information about the user on the web page, and directly load the pre-downloaded resource files through a browser after determining that the user selects a network online application, so that the running speed of the network online application and the loading speed of the resource files can be increased, thereby improving user experience of the network online application.

Figure 2:
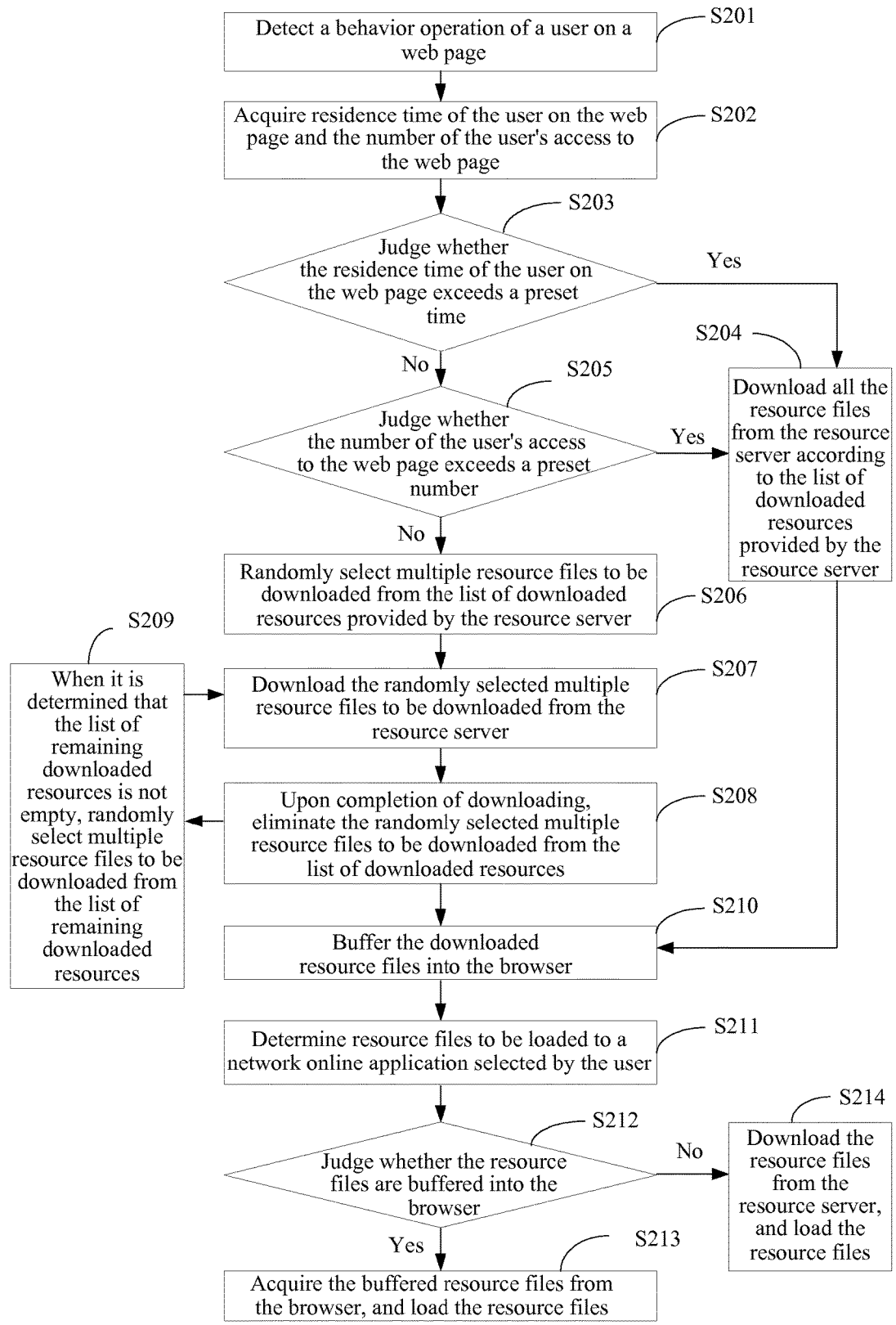
FIG. 2 is a specific flow chart of a method for loading resources files of an application according to some embodiments of the present application.

FIG. 2 is a specific flow chart of a method for loading resources files of an application according to some embodiments of the present application.

In this embodiment, in step S201, detect a behavior operation of a user on a web page. In this embodiment, when a new user or an old user accesses a certain web page, if he is interested in a certain network online application, the user may spend some time on the web page in understanding the network online application, or he may constantly access the web page or network online application; or when the old user accesses a certain web page, he may log on to a certain network online application in the form of inputting account number and password, the old user needs to spend some time in completing the login operation process, at this time, the browser may detect a behavior operation of the user on the web page, and the behavior operation may include the user's residence on the web page and the user's access operation on the web page.

In step S202, acquire residence time of the user on the web page and the number of the user's access to the web page.

In step S203, judge whether the residence time of the user on the web page exceeds a preset time. In this embodiment, when it is judged that the residence time of the user on the web page exceeds the preset time, perform step S204; and when it is judged that the residence time of the user on the web page does not exceed the preset time, perform step S205. In this embodiment, the preset time may be set according to actual demands.

In step S204, download all the resource files from the resource server according to the list of downloaded resources provided by the resource server. In this embodiment, the browser may first acquire a list of downloaded resources from the resource server, and then the browser, according to the judgment result in step S203, downloads all the resource files in the list of downloaded resources from the resource server. After step S204 is performed, perform step S210.

In step S205, judge whether the number of the user's access to the web page exceeds a preset number. In this embodiment, when it is determined that the number of the user's access to the web page exceeds a preset number, perform step S204; and when it is determined that the number of the user's access to the web page does not exceed a preset number, perform step S206. In this embodiment, the preset number may be set according to actual demands.

In step S206, randomly select multiple resource files to be downloaded from the list of downloaded resources provided by the resource server.

In step S207, download the randomly selected multiple resource files to be downloaded from the resource server.

In step S208, upon completion of downloading, eliminate the randomly selected multiple resource files to be downloaded from the list of downloaded resources.

Upon completion of step S208, step S209 and step S210 can be performed at the same time.

Upon completion of step S208, at this time, it is necessary to determine whether the list of remaining downloaded resources is not empty, that is, it is necessary to determine whether the resource files in the list of downloaded resources have been completely downloaded.

In step S209, when it is determined that the list of remaining downloaded resources is not empty, randomly select multiple resource files to be downloaded from the list of remaining downloaded resources, and at this time, perform step S207, that is, circularly download the resource files.

Upon completion of step S208, at this time, it is necessary to buffer the downloaded resource files, that is, step S210, and buffer the downloaded resource files into the browser.

In this embodiment, when the user has not completed selection of a network online application, he can pre-download a network online application into the browser after performing steps S201 to S210.

In step S211, determine resource files to be loaded to a network online application selected by the user. In this embodiment, when the user is interested in a certain network online application or logs on to a certain network online application, the user may select the network online application, and at this time, the browser may detect the user's operation instruction for the selected network online application, for example, click a certain network online application or log on to a certain network online application. When the browser detects the user's operation instruction for the selected network online application, it can be determined that the user selects the network online application, and at this time, resource files to be loaded to the network online application are also determined.

In step S212, judge whether the resource files to be loaded to the network online application are buffered into the browser. In this embodiment, when it is judged that the resource files to be loaded have been buffered into the browser, perform step S213; and when it is judged that the resource files to be loaded have not been buffered into the browser, perform step S214. In this embodiment, version information of the resource files to be loaded to the network online application can match version information of the resource files that have been buffered into the browser, so that whether the resource files to be loaded to the network online application are buffered into the browser can be judged.

In step S213, acquire the buffered resource files from the browser, and load the resource files.

In step S214, download the resource files from the resource server, and load the resource files.

With the technical solution provided in this embodiment of the present application, when a user does not select a network online application, pre-download required resource files from a resource server according to behavior operation information about the user on the web page, and directly load the pre-downloaded resource files through a browser after determining that the user selects a network online application, so that the running speed of the network online application and the loading speed of the resource files can be increased, thereby improving user experience of the network online application.

Figure 3:
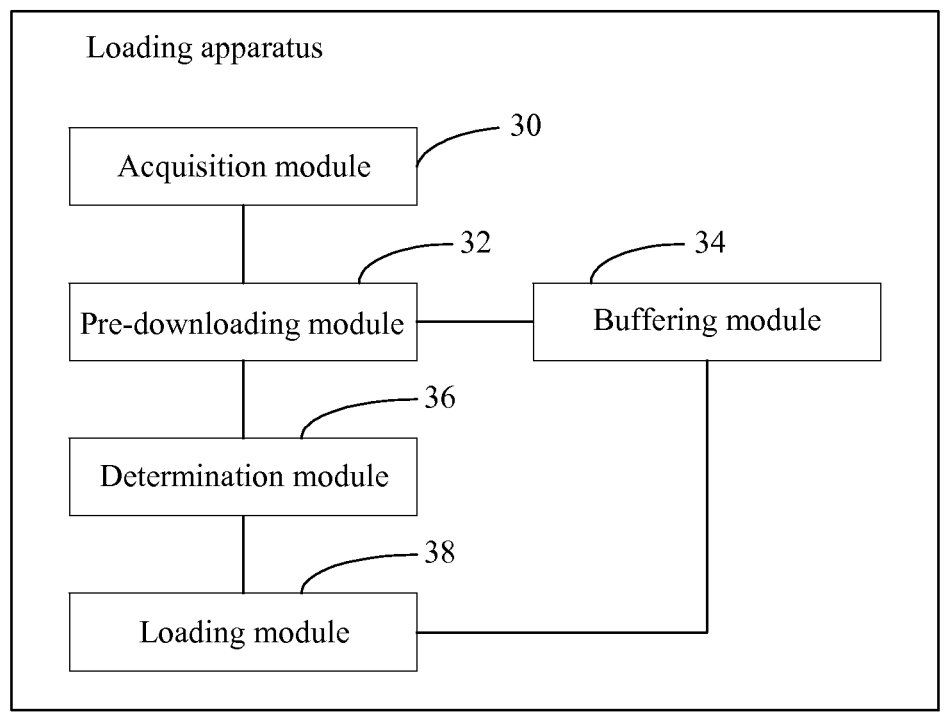
FIG. 3 is an overall structural view of a loading apparatus for loading resources files of an application according to some embodiments of the present application.

FIG. 3 is an overall structural view of a loading apparatus for loading resources files of an application according to some embodiments of the present application.

In this embodiment, the loading apparatus may be embedded into a browser. In this embodiment, a user can log on to a web page through a web browser in a mobile terminal, and to browse a variety of information in the web page, such as information and various network online applications. In this embodiment, the network online applications may include, but are not limited to, web games, web online chat and so on. After the user selects a certain network online application, he can directly run the selected network online application in the browser. In this embodiment, before the user selects a certain network online application, the browser may determine, according to behavior operation information about the user on the web page, whether the user is interested in selecting certain network online applications, or determine whether the user understands information about a certain network online application, or determine whether the user is logging on to a certain network online application. Then, pre-download resource files of the network online application according to a list of downloaded resources provided by a resource server, and after the user selects a certain network online application, load the pre-downloaded resource files of the network online application.

In this embodiment, the loading apparatus includes an acquisition module 30, a pre-downloading module 32, a buffering module 34, a determination module 36, and a loading module 38.

In this embodiment, the acquisition module 30 is used for acquiring behavior operation information about the user on a web page. In this embodiment, when the user accesses a web page through a browser, the behavior operation information may include, but is not limited to, residence time of the user on the web page, and the number of user's access to the web page. In this embodiment, when a new user or an old user accesses a certain web page, if he is interested in a certain network online application, the user may spend some time on the web page in understanding the network online application, or he may constantly access the web page or network online application; or when the old user accesses a certain web page, he may log on to a certain network online application in the form of inputting account number and password, and the old user needs to spend some time in completing the login operation process.

The pre-downloading module 32 is used for determining resource files to be downloaded from the resource server according to the behavior operation information about the user, and download the resource files. In this embodiment, when the browser runs the network online application, it is necessary to load resource files included therein, and upon success of the loading, normal running of the network online application can be ensured.

In this embodiment, the pre-downloading module 32 may first acquire a list of downloaded resources from the resource server, then, determine resource files to be downloaded in the list of resources according to the behavior operation information about the user, and download the resource files. In this embodiment, the list of downloaded resources include, but is not limited to, resource files of all network online applications, or resource files of some network online applications.

The buffering module 34 is used for buffering the resource files that have been downloaded by the pre-downloading module 32.

The determination module 36 is used for determining resource files to be loaded to a network online application selected by the user. In this embodiment, when the user is interested in a certain network online application or logs on to a certain network online application, the user may select the network online application, and at this time, the browser may detect the user's operation instruction for the selected network online application, for example, click a certain network online application or log on to a certain network online application. When the browser detects the user's operation instruction for the selected network online application, it can be determined that the user selects the network online application, and at this time, resource files to be loaded to the network online application are also determined.

The loading module 38 is used for loading the resource files when it is determined that the resource files to be loaded have been buffered into the browser.

With the technical solution provided in this embodiment of the present application, when a user does not select a network online application, pre-download required resource files from a resource server according to behavior operation information about the user on the web page, and directly load the pre-downloaded resource files through a browser after determining that the user selects a network online application, so that the running speed of the network online application and the loading speed of the resource files can be increased, thereby improving user experience of the network online application.

Figure 4:
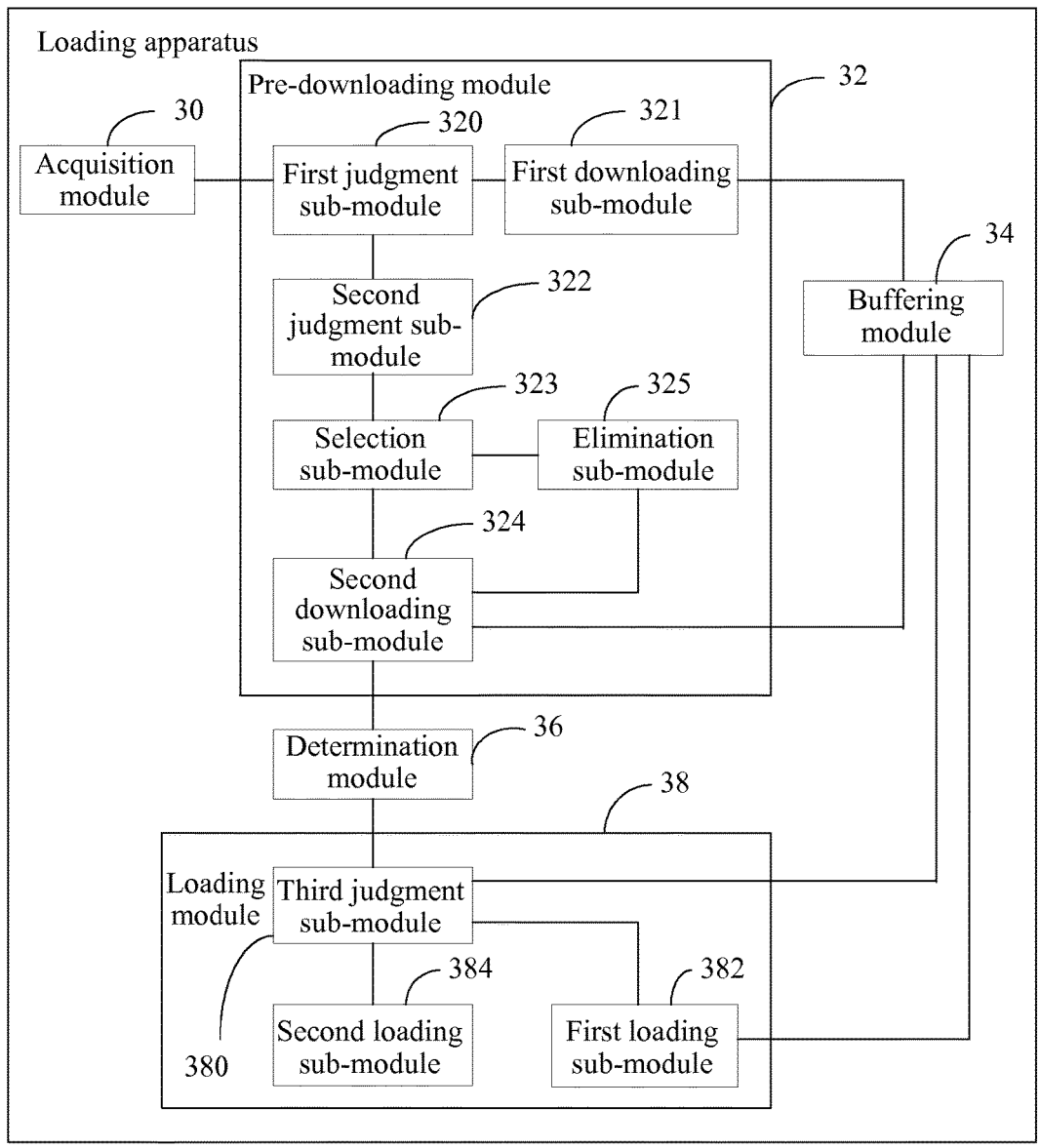
FIG. 4 is a specific structural view of a loading apparatus for loading resources files of an application according to some embodiments of the present application.

FIG. 4 is a specific structural view of a loading apparatus for loading resources files of an application according to some embodiments of the present application.

In this embodiment, the loading apparatus includes an acquisition module 30, a pre-downloading module 32, a buffering module 34, a determination module 36, and a loading module 38. The pre-downloading module 32 further includes a first judgment sub-module 320, a first downloading sub-module 321, a second judgment sub-module 322, a selection sub-module 323, an elimination sub-module 325 and a second downloading sub-module 324; and the loading module 38 includes a third judgment sub-module 380, a first loading sub-module 382, and a second loading sub-module 384.

In this embodiment, firstly, the acquisition module 30 is used for first detecting a behavior operation of the user on the web page. In this embodiment, when a new user or an old user accesses a certain web page, if he is interested in a certain network online application, the user may spend some time on the web page in understanding the network online application, or he may constantly access the web page or network online application; or when the old user accesses a certain web page, he may log on to a certain network online application in the form of inputting account number and password, the old user needs to spend some time in completing the login operation process, at this time, the browser may detect a behavior operation of the user on the web page, and the behavior operation may include the user's residence on the web page and the user's access operation on the web page. Secondly, the acquisition module 30 is further used for acquiring residence time of the user on the web page and the number of the user's access to the web page.

In this embodiment, the first judgment sub-module 320 of the pre-downloading module 32 is used for judging whether the residence time of the user on the web page exceeds a preset time. The first downloading sub-module 321 of the pre-downloading module 32 is used for downloading all the resource files from the resource server according to the list of downloaded resources provided by the resource server when the first judgment sub-module 320 judges that the residence time of the user on the web page exceeds the preset time. In this embodiment, the first downloading sub-module 321 may first acquire a list of downloaded resources from the resource server, and then downloads, according to the judgment result of the first judgment sub-module 320, all the resource files in the list of downloaded resources from the resource server.

The second judgment sub-module 322 of the pre-downloading module 32 is used for judging whether the number of the user's access to the web page exceeds a preset number when the first judgment sub-module 320 judges that the residence time of the user on the web page does not exceed the preset time.

The selection sub-module 323 of the pre-downloading module 32 is used for randomly selecting multiple resource files to be downloaded from the list of downloaded resources provided by the resource server. The second downloading sub-module 324 is used for downloading the multiple resource files to be downloaded randomly selected by the selection sub-module 323 from the resource server. At this time, the elimination sub-module 325 is used for eliminating the randomly selected multiple resource files to be downloaded from the list of downloaded resources, and performing the function of the selection sub-module 323 once again. At this time, the selection sub-module 323 is further used for, when it is determined that the list of remaining downloaded resources is not empty, randomly selecting multiple resource files to be downloaded from the list of remaining downloaded resources, and performing the function of the second downloading sub-module 324 once again.

The buffering module 34 is used for buffering the resource files downloaded by the first downloading sub-module 321 and the second downloading sub-module 324.

The determination module 36 is used for determining resource files to be loaded to a network online application selected by the user. In this embodiment, when the user is interested in a certain network online application or logs on to a certain network online application, the user may select the network online application, and at this time, the browser may detect the user's operation instruction for the selected network online application, for example, click a certain network online application or log on to a certain network online application. When the determination module 36 detects the user's operation instruction for the selected network online application, it can be determined that the user selects the network online application, and at this time, resource files to be loaded to the network online application are also determined.

The third judgment sub-module 380 of the loading module 38 is used for judging whether the resource files to be loaded to the network online application determined by the determination module 36 are buffered into the buffering module 34. In this embodiment, version information of the resource files to be loaded to the network online application can match version information of the resource files that have been buffered into the browser, so that whether the resource files to be loaded to the network online application are buffered into the browser can be judged.

The first loading sub-module 382 of the loading module 38 is used for acquiring the buffered resource files from the buffering module 34, and loading the resource files when it is judged that the resource files to be loaded to the network online application have been buffered into the buffering module 34.

The second loading sub-module 382 of the loading module 38 is used for downloading the resource files from the resource server, and loading the resource files when it is judged that the resource files to be loaded to the network online application have not been buffered into the buffering module 34.

With the technical solution provided in this embodiment of the present application, when a user does not select a network online application, pre-download required resource files from a resource server according to behavior operation information about the user on the web page, and directly load the pre-downloaded resource files through a browser after determining that the user selects a network online application, so that the running speed of the network online application and the loading speed of the resource files can be increased, thereby improving user experience of the network online application.

Figure 5:
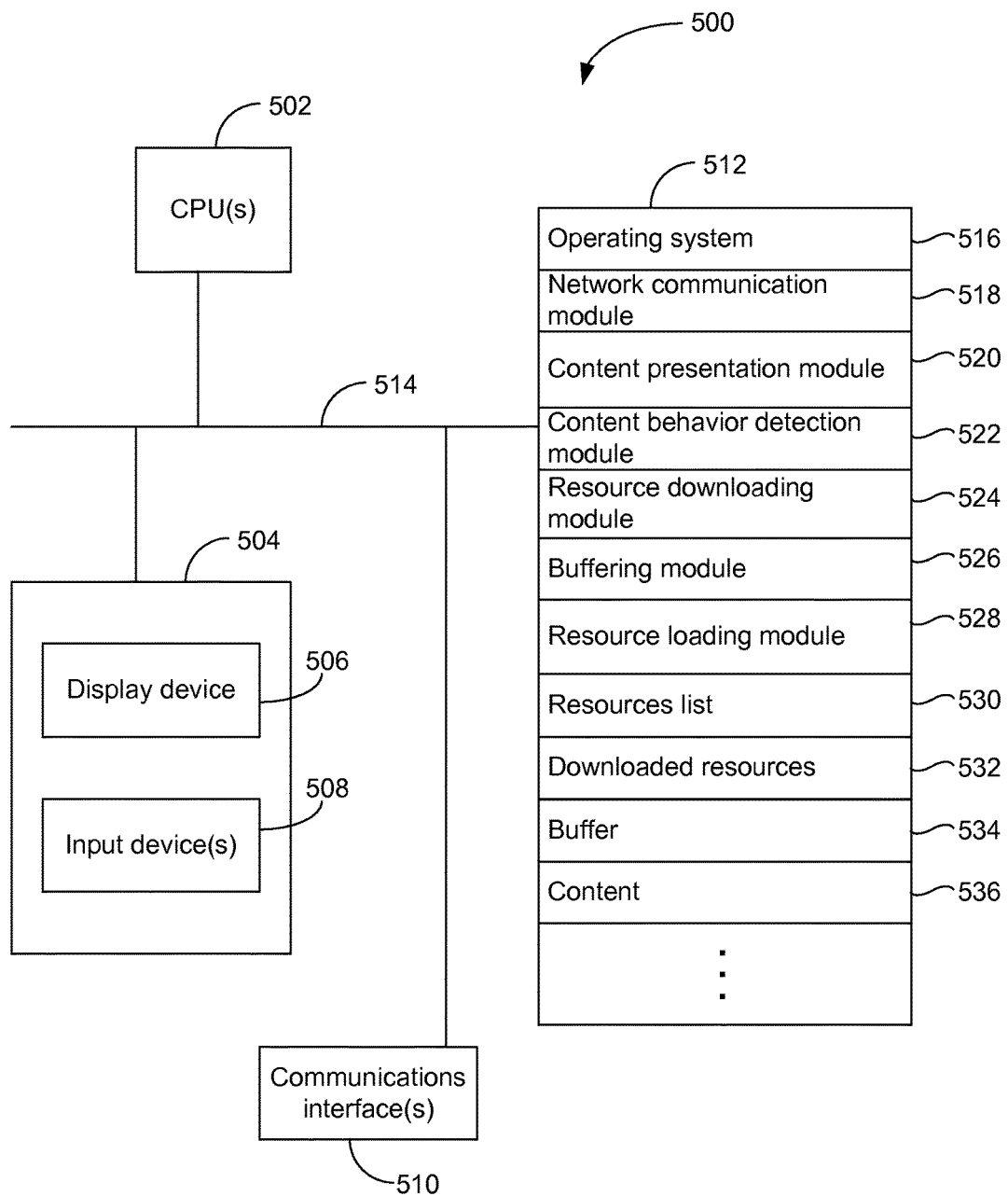
FIG. 5 is a block diagram illustrating a client device in accordance with some embodiments of the present application.

FIG. 5 is a block diagram illustrating a client device 500 in accordance with some embodiments of the present application. The client device 500 typically includes one or more processing units (CPU's) 502 for executing modules, programs and/or instructions stored in memory 512 and thereby performing processing operations; one or more network or other communications interfaces 510; memory 512; and one or more communication buses 514 for interconnecting these components. The communication buses 514 optionally include circuitry (sometimes called a chipset) that interconnects and controls communications between system components. The client device 500 includes a user interface 504 comprising a display device 506 and one or more input device(s) (e.g., keyboard, mouse, touch-sensitive surface) 508. In some embodiments, an input device 508 is integrated with the display device 506. For example, a touch screen includes a touch-sensitive surface integrated with the display device 506. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. Memory 512, or alternately the non-volatile memory device(s) within memory 512, comprises a non-transitory computer readable storage medium. In some embodiments, memory 512, or the computer readable storage medium of memory 512 stores the following programs, modules and data structures, or a subset thereof:

- an operating system 516 that includes procedures for handling various basic system services and for performing hardware dependent tasks;
- a network communication module 518 that is used for connecting the client device 500 to other computers via the one or more communication network interfaces 510 (wired or wireless) and one or more communication networks, such as the Internet, other wide area networks, local area networks, metropolitan area networks, and so on;
- a content presentation module 520 for presenting (e.g., displaying) content 536 (e.g., webpages) to users;
- a content behavior detection module 522 for detecting user behavior with respect to content presented by the content presentation module 540 and comparing the detected behavior against predefined criteria;
- a resource downloading module 524 for retrieving resources lists and downloading resources (e.g., resource files) from servers;
- a buffering module 526 for buffering downloaded resources 532 into a buffer (e.g., web browser cache 534);
- a resource loading module 528 for loading resources to run an online application;
- a resources list 530 for listing resources to be downloaded to run one or more online applications;
- downloaded resources 532, which are resources that have been downloaded to the device 500;
- a buffer 534 for buffering or caching downloaded resources 532; and
- content 536.

In some embodiments, the content presentation module 520 is a web browser, and the content 536 are web pages. In some embodiments, the buffer 534 is a cache for the content presentation module 520 (e.g., web browser cache for a web browser).

In some embodiments, the modules 520, 522, 524, 526, and 528 components of a loading apparatus as described above with reference to FIG. 3 or 4.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows a "client device," FIG. 5 is intended more as functional description of the various features which may be present in a set of client devices than as a structural schematic of the embodiments described herein. In practice, and as recognized by those of ordinary skill in the art, items shown separately could be combined and some items could be separated.

Figure 6:
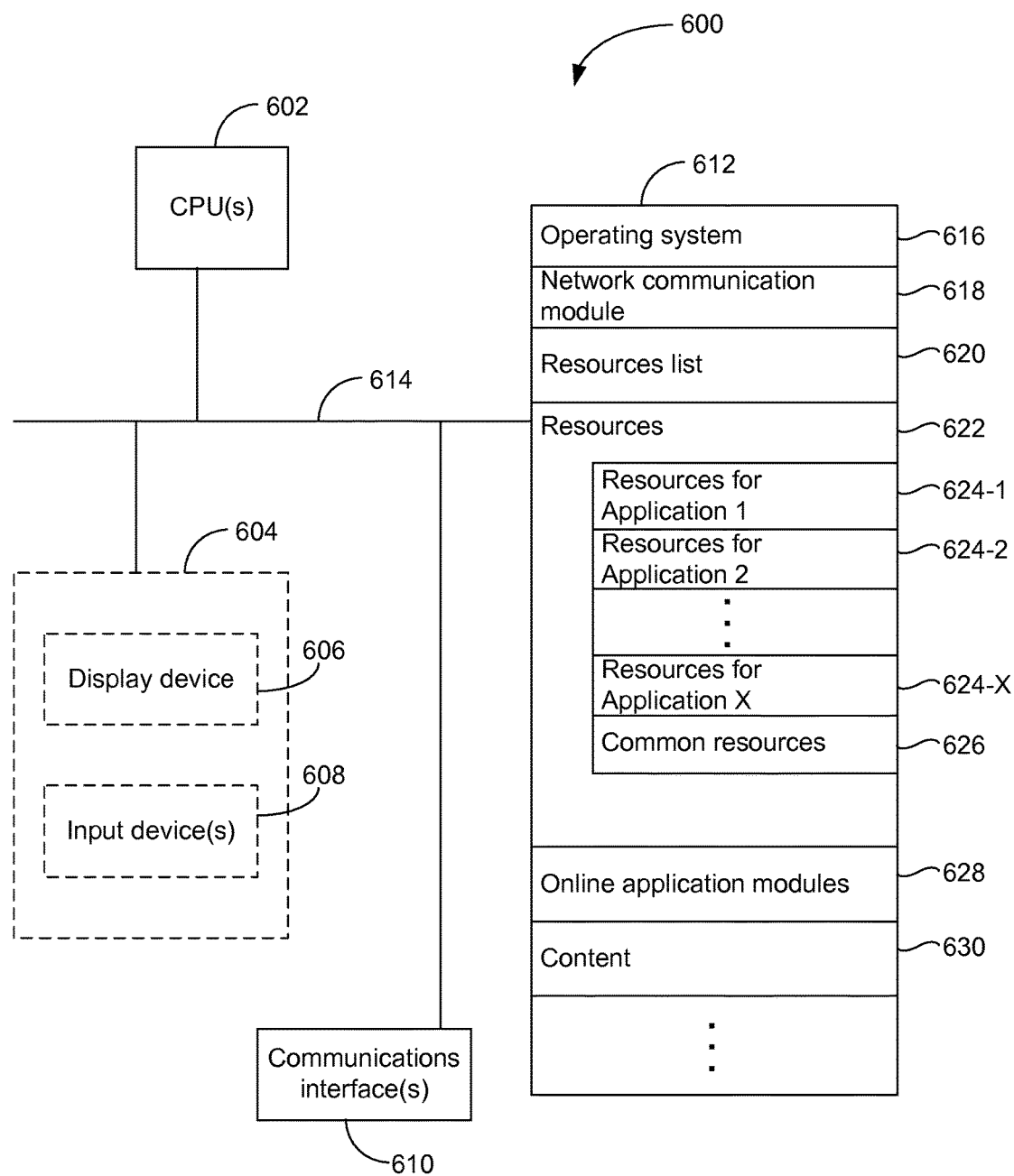
FIG. 6 is a block diagram illustrating a server in accordance with some embodiments of the present application.

FIG. 6 is a block diagram illustrating a server 600 in accordance with some embodiments of the present application. The client device 600 typically includes one or more processing units (CPU's) 602 for executing modules, programs and/or instructions stored in memory 612 and thereby performing processing operations; one or more network or other communications interfaces 610; memory 612; and one or more communication buses 614 for interconnecting these components. The communication buses 614 optionally include circuitry (sometimes called a chipset) that interconnects and controls communications between system components. The client device 600 optionally includes a user interface 604 comprising a display device 606 and one or more input device(s) (e.g., keyboard, mouse, touch-sensitive surface) 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the client device 600 to other computers via the one or more communication network interfaces 610 (wired or wireless) and one or more communication networks, such as the Internet, other wide area networks, local area networks, metropolitan area networks, and so on;
- a resources list 620 that lists respective resources (e.g., resource files) for a respective online application;
- resources 622 (e.g., resource files) that need to be loaded at a client device to access respective online applications from the client device;
- online application modules 628; and
- content 630.

Resources 622 include respective sets of resources 624-1 thru 624-X for respective online applications. For example, resources 624-1 are resources for a first online application (e.g., "Application 1"), resources 624-2 are resources for a second online application (e.g., "Application 2"), and so on. Resources 622 also include common resources 626 that are resources common to multiple online applications.

Online application modules 628 include respective modules for one or more online applications hosted by the server 600. These modules communicate and exchange data with client devices accessing the online applications.

Content 630 includes content related to the online applications hosted by the server 600. In some embodiments, content 630 includes web pages that provide information about the online applications and provide respective login portal for the online applications.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "server," FIG. 6 is intended more as functional description of the various features which may be present in a set of client devices than as a structural schematic of the embodiments described herein. In practice, and as recognized by those of ordinary skill in the art, items shown separately could be combined and some items could be separated. For example, resources list 620 and resources 622 may be stored in a distributed server system.

Figure 7A:
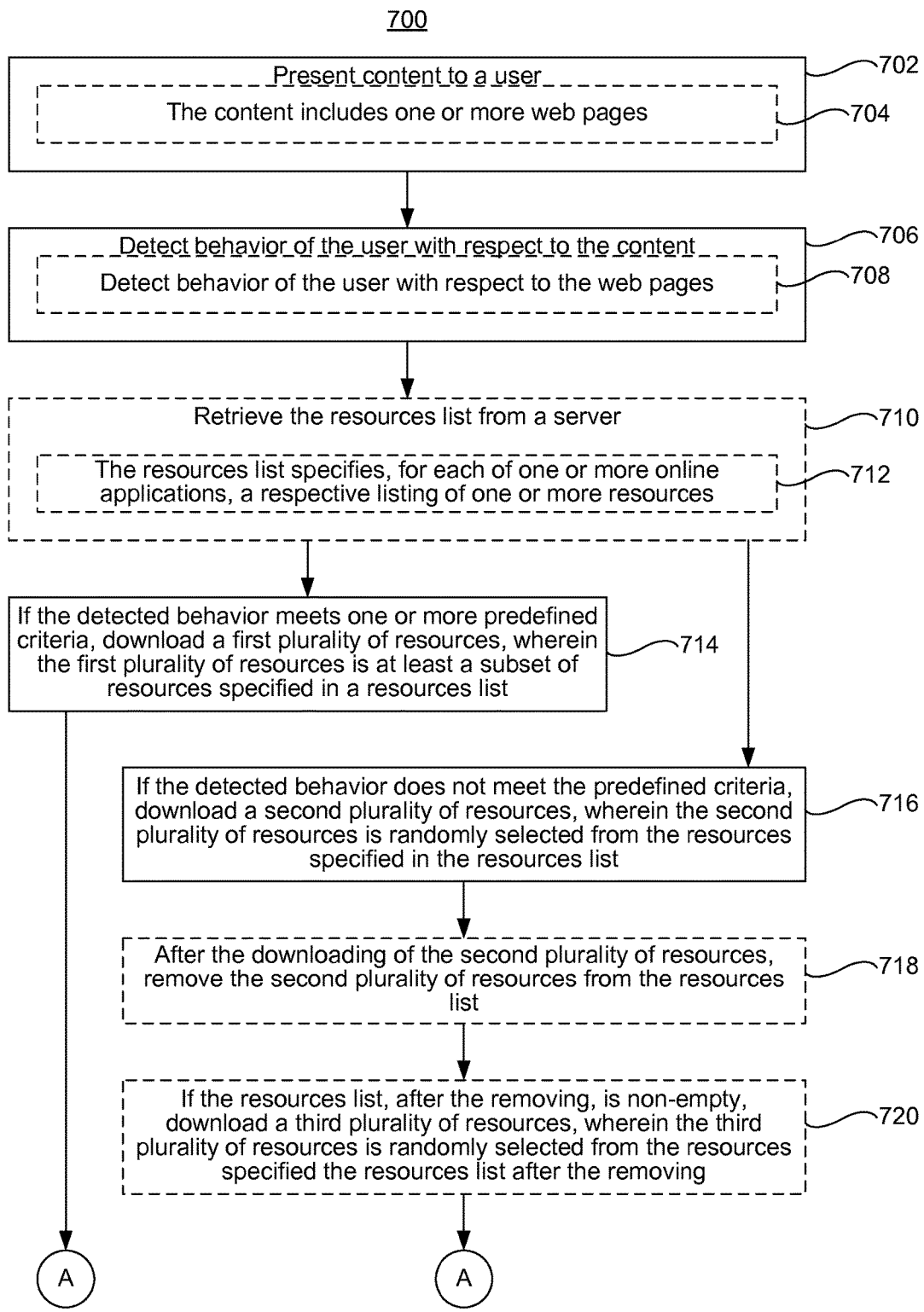
FIGS. 7A-7C are a flow diagram of a method for unlocking user data in accordance with some embodiments of the present application.
Figure 7B:
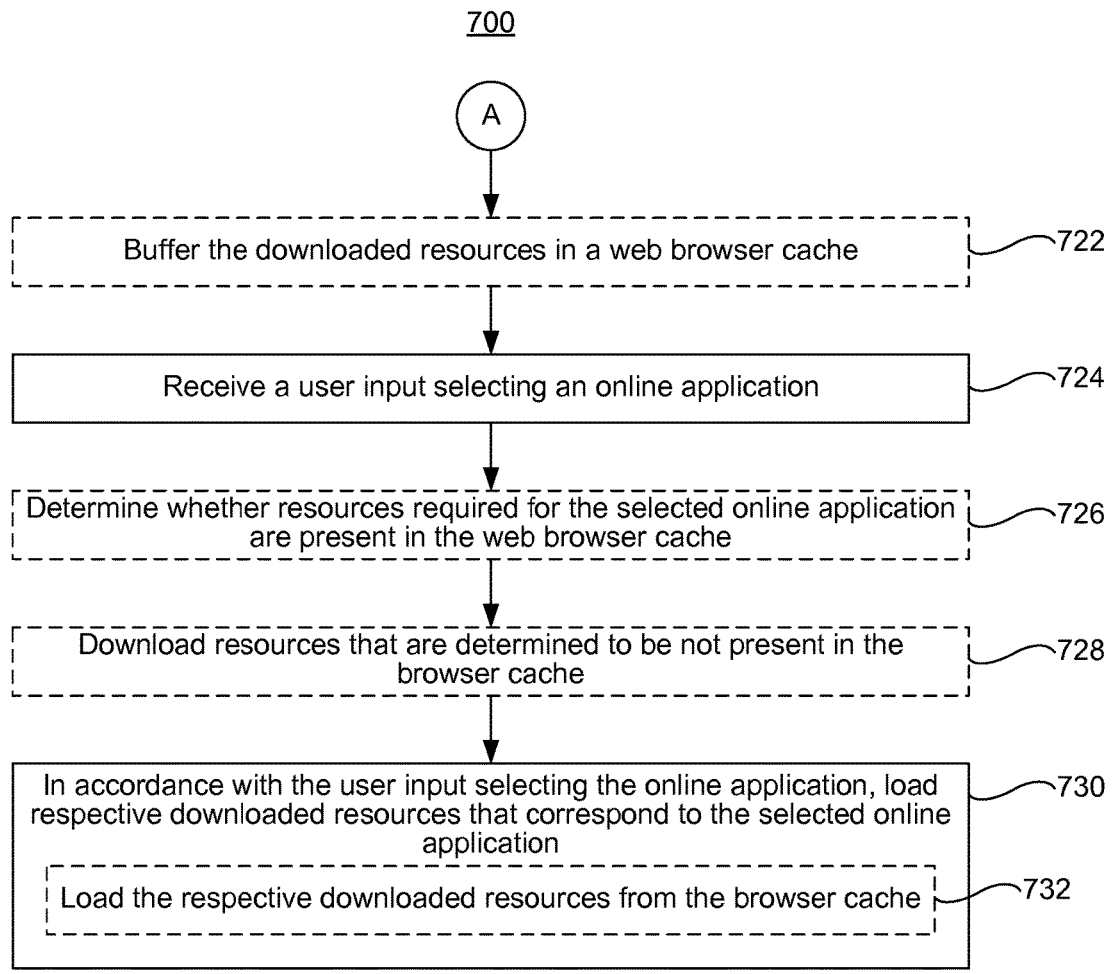
Figure 7C:
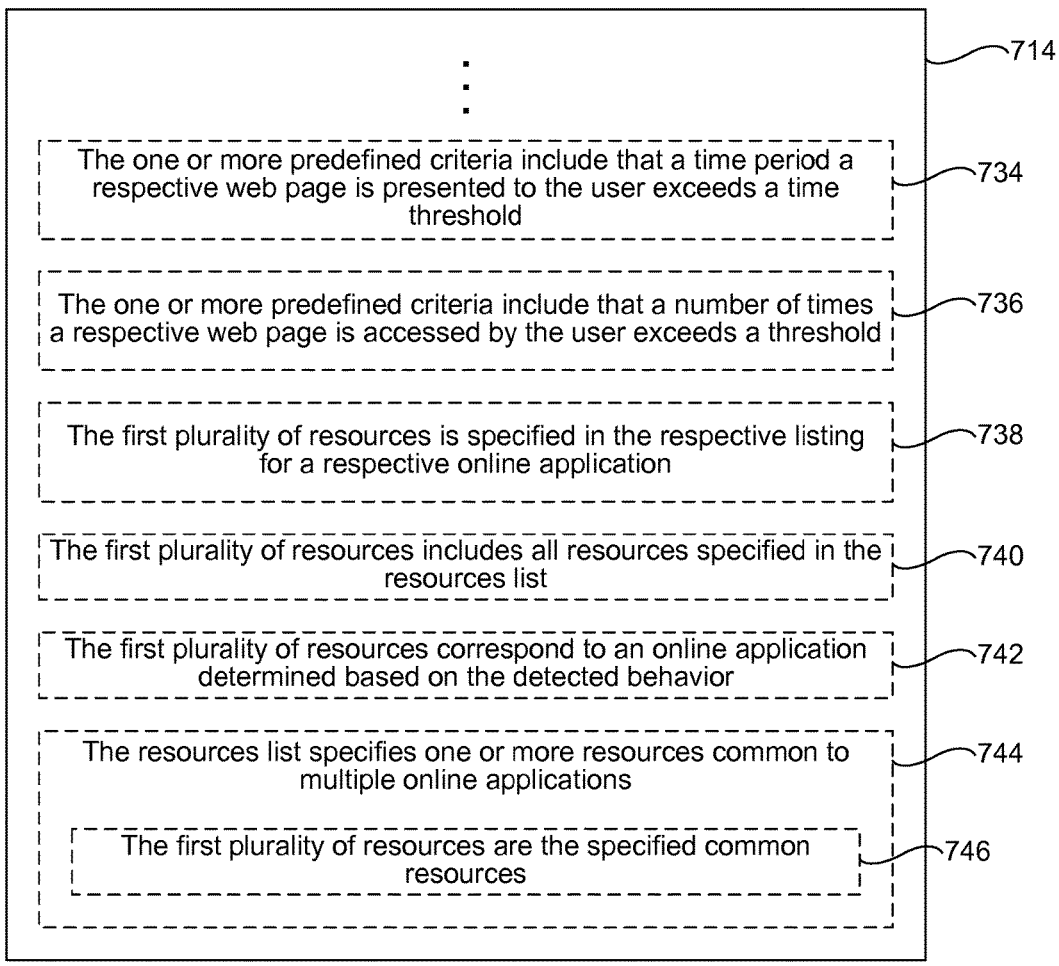
Figure 7C:
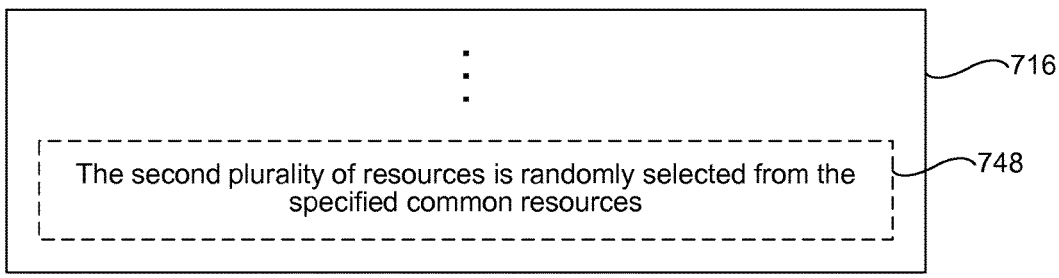

FIGS. 7A-7C illustrate a flow diagram of a method 700 for unlocking user data in accordance with some embodiments of the present application. In some embodiments, the method 700 is performed at a client device (e.g., client device 500, the loading apparatus illustrated in FIG. 3 or 4).

The client device presents (702) content to a user. For example, the client device 500 downloads the content 630 (e.g., one or more web pages) from server 600, and the content presentation module 520 presents the content to the user (e.g., by displaying them on the display device 530) as content 536. The content 536 includes information about one or more online applications, as well as pages for accessing these online applications (e.g., login pages for these online applications). The user can, through the content 536, browse information related to one or more online applications and to log into any of these online applications. In some embodiments, when the user logs into one of the online applications, the online application user interface is presented through the content presentation module 520.

The client device detects (706) behavior of the user with respect to the content. As the user views the content 630 at the client device 500, the content behavior detection module 522, for example, detects how long the user accesses respective items (e.g., respective web pages) of content 536 and how many times the user accesses respective items of content 536 (e.g., as in step S100 in FIG. 1 or steps S201-S202 in FIG. 2 above). The content behavior detection module 522 can thus detect if the user spends more time on particular web pages and/or accesses particular web pages more often, and thus detect which online application the user is interested in, based on which web pages the user spends more time on and/or accesses more often.

If the detected behavior meets one or more predefined criteria, the client device downloads (714) a first plurality of resources, where the first plurality of resources is at least a subset of resources specified in a resources list. If the detected behavior meets the predefined criteria (e.g., as in step S203-Yes or S205-Yes in FIG. 2 above), the resources downloading module 524 downloads particular resources from the server 600 according to a resources list 530 (e.g., as in step S204 in FIG. 2 above) and stores these downloaded resources 532 in memory 512. The particular resources that are downloaded are at least a subset of the resources 622 stored at the server 600 and as listed in resources list 530.

In some embodiments, the content behavior detection module 522 determines which online application the user is interested in or is most likely to access based on the user behavior with respect to the content 536. For example, if the user spends most of his time and/or has the highest number of accesses with web pages for a particular online application, the content behavior detection module 522 can determine that the user is interested in that particular online application and/or is most likely to access that online application. Resources downloading module 524 can download the resources for that particular online application that the content behavior detection module 522 determines the user is interested in or is most likely to access.

If the detected behavior does not meet the predefined criteria, the client device downloads (716) a second plurality of resources, where the second plurality of resources is randomly selected from the resources specified in the resources list. If the predefined criteria are not meet, the resources downloading module 524 selects, randomly, a number of resources from the resources list 530 and downloads the selected resources (e.g., as in steps S206-S207 in FIG. 2 above) and stores these downloaded resources 532 in memory 512. The number of resources that are randomly selected for download is predefined or random. In some embodiments, after the download of the selected resources is complete, the selected resources are removed from the resources list 530 (e.g., as in step S208 in FIG. 2 above).

The client device receives (724) a user input selecting an online application. For example, while browsing the content 536, the user selects an online application to access from within the content 536, and proceeds to log into the online application (e.g., log into the online application directly, select the online application from a portal page to which the user is logged in).

In accordance with the user input selecting the online application, the client device loads (730) respective downloaded resources that correspond to the selected online application. The resource loading module 528 loads the resources 532 for the selected online application that have been downloaded, and content presentation module 520 runs the online application with the loaded resources and presents the online application to the user. The client device determines which resource files to load (e.g., as in step S106 in FIG. 1 or S211 in FIG. 2 above), in this case the selected online application, and loads the resource files for the selected on line application (e.g., as in step S108 in FIG. 1 or S213 in FIG. 2 above).

In some embodiments, the content includes one or more web pages (704), and detecting behavior of the user with the content includes detecting behavior of the user with respect to the web pages (708). For example, content 536/630 include one or more web pages that include information about the online applications. Detecting behavior of the user with respect to the content thus includes detecting the user's behavior with respect to the web pages (e.g., how much time the user spends on respective web pages, how many times the user accesses respective web pages).

In some embodiments, the one or more predefined criteria include that a time period a respective web page is presented to the user exceeds a time threshold (734). In some embodiments, the one or more predefined criteria include that a number of times a respective web page is accessed by the user exceeds a threshold (736). As in step S203 or S205 in FIG. 2 above, the criteria includes whether the time the user spends on a respective web page exceeds a time threshold or whether the user's number of accesses of a respective web page exceeds a number threshold.

In some embodiments, the client device retrieves (710) the resources list from a server. For example, the client device retrieves the resources list 620 from the server 600 and stores it as resources list 530 in memory 512.

In some embodiments, the resources list specifies, for each of one or more online applications, a respective listing of one or more resources (712). For example, the resources list 530/620 lists resources 624-1 for a first online application, resources 624-2 for a second application, and so on. The resources list 530/620 can also list resources 626 that are common to multiple online applications.

In some embodiments, the first plurality of resources is specified in the respective listing for a respective online application (738). The first plurality of resources that is downloaded if the predefined criteria are satisfied is, for example, the resources listed in the resources list 530 for a respective application. For example, if the content behavior detection module 522 determines that the user is most likely to access an "Application 1," then the resource downloading module 524 downloads specifically the resources 624-1 for "Application 1."

In some embodiments, the first plurality of resources includes all resources specified in the resources list (740). For example, as in step S204 in FIG. 2 above, the resource downloading module 524 downloads all of resources 622 from the server 600.

In some embodiments, the first plurality of resources correspond to an online application determined based on the detected behavior (742). For example, as described above, if content behavior detection module 522 determines that the user is interested in a particular online application is most likely to access a particular online application, the resource downloading module 524 downloads the resources for that application (e.g., resources 624-1 if "Application 1" is the determined online application.

In some embodiments, the resources list specifies one or more resources common to multiple online applications (744). For example, the resources list 530/620 lists common resources 626 that are common to multiple online applications.

In some embodiments, the first plurality of resources is the specified common resources (746). For example, if the predefined criteria are met, the resource downloading module 524 downloads common resources 626 as listed in resources list 530.

In some embodiments, the second plurality of resources is randomly selected from the specified common resources (748). For example, the resources that are randomly selected for downloaded, if the predefined criteria are not met, are selected randomly from common resources 630 as listed in the resources list 530.

In some embodiments, after completing the downloading of the second plurality of resources, after the downloading of the second plurality of resources, the client device removes (718) the second plurality of resources from the resources list, and if the resources list, after the removing, is non-empty, downloads (720) a third plurality of resources, where the third plurality of resources is randomly selected from the resources specified the resources list after the removing. As in steps S206-S209 in FIG. 2 above, if the predefined criteria are not met, the resource downloading module 524 selects resources at random from resources listed in the resources list 530 and downloads them. After these selected resources are downloaded, they are removed from the resources list 530 or otherwise flagged or marked as downloaded. If the resources list has resources that are not downloaded, the resource downloading module 524 selects randomly a number (predefined or random) of resources to download and downloads these selected resources. In some embodiments, this cycle goes on until all of the resources listed in resources list 530 are downloaded (as in steps S206-S209 in FIG. 2 above) or until a predefined or random number of cycles are completed.

In some embodiments, the client device buffers the downloaded resources in a web browser cache (722), and loading the respective downloaded resources that correspond to the selected online application includes loading (732) the respective downloaded resources from the browser cache. For example, the buffering module 526 buffers the downloaded resources 532 into buffer 534 (e.g., a web browser cache), as in step S210 in FIG. 2 above. When the resource loading module 528 loads the downloaded resources 532 for an online application, the resource loading module 528 loads them from the buffer 534, as in steps S211-S214 in FIG. 2 above.

In some embodiments, the client device determines (726) whether resources required for the selected online application are present in the web browser cache, and downloads (728) resources that are determined to be not present in the browser cache. After receiving the user input selecting an online application (724), the resource loading module 528 determines if the resources for the selected online application have been buffered into the buffer 534 (e.g., a web browser cache), as in step S212 in FIG. 2 above. The resources loading module 528 loads the downloaded resources 532 for the selected online application that have been buffered, and downloads the remainder of the resources 622 for the online application, which have not been downloaded yet.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
   at a client device:
   presenting, to a user, content from a webpage, wherein the content includes an online application;
   detecting behavior of the user with respect to the content, including determining a number of times the web page has been accessed by the user;
   in accordance with a determination that the number of times the web page has been accessed by the user exceeds a threshold, downloading a first plurality of resources, wherein the first plurality of resources is at least a subset of resources specified in a resources list and the first plurality of resources is particular to the online application;
   in accordance with a determination that the number of times the web page has been accessed by the user does not exceed the threshold, downloading a second plurality of resources, wherein the second plurality of resources is randomly selected from the resources specified in the resources list;
   receiving a user input selecting an online application; and
   in response to the user input selecting the online application, loading respective downloaded resources that correspond to the selected online application.

2. The method of claim 1, wherein detecting the behavior of the user with respect to the content from the webpage further includes determining whether a time period that the web page is presented to the user exceeds a time threshold.

3. The method of claim 1, further comprising: retrieving the resources list from a server.

4. The method of claim 1, wherein the resources list specifies, for each of one or more online applications, a respective listing of one or more resources.

5. The method of claim 4, wherein the first plurality of resources is specified in the respective listing for the online application.

6. The method of claim 1, wherein the first plurality of resources comprises all resources specified in the resources list.

7. The method of claim 1, wherein the online application is determined based on the detected behavior.

8. The method of claim 1, wherein the resources list specifies one or more resources common to multiple online applications.

9. The method of claim 8, wherein the first plurality of resources are the specified common resources.

10. The method of claim 8, wherein the second plurality of resources is randomly selected from the specified common resources.

11. The method of claim 1, further comprising:
after completing the downloading of the second plurality of resources:
removing the second plurality of resources from the resources list; and
in accordance with a determination that the resources list, after the removing, is non-empty, downloading a third plurality of resources, wherein the third plurality of resources is randomly selected from the resources specified the resources list after the removing.

12. The method of claim 1, further comprising buffering the downloaded resources in a web browser cache, wherein loading the respective downloaded resources that correspond to the online application comprises loading the respective downloaded resources from the browser cache.

13. The method of claim 12, further comprising:
determining whether resources required for the online application are present in the web browser cache; and
downloading resources that are determined to be not present in the browser cache.

14. A client device, comprising:
a display;
memory;
one or more processors; and
one or more programs, wherein the one or more programs are stored in the memory and configured to be executed by the one or more processors, the one or more programs comprising instructions for:
presenting, to a user, content from a webpage, wherein the content includes an online application;
detecting behavior of the user with respect to the content, including determining a number of times the web page has been accessed by the user;
in accordance with a determination that the number of times the web page has been accessed by the user exceeds a threshold, downloading a first plurality of resources, wherein the first plurality of resources is at least a subset of resources specified in a resources list and the first plurality of resources is particular to the online application;
in accordance with a determination that the number of times the web page has been accessed by the user does not exceed the threshold, downloading a second plurality of resources, wherein the second plurality of resources is randomly selected from the resources specified in the resources list;
receiving a user input selecting an online application; and
in response to the user input selecting the online application, loading respective downloaded resources that correspond to the selected online application.

15. A non-transitory computer readable storage medium storing one or more programs, the one or more programs comprising instructions, which when executed by a server, cause the device to:
present, to a user, content from a webpage, wherein the content includes an online application;
detect behavior of the user with respect to the content, including determining a number of times the web page has been accessed by the user;
in accordance with a determination that the number of times the web page has been accessed by the user exceeds a threshold, download a first plurality of resources, wherein the first plurality of resources is at least a subset of resources specified in a resources list and the first plurality of resources is particular to the online application;
in accordance with a determination that the number of times the web page has been accessed by the user does not exceed the threshold, download a second plurality of resources, wherein the second plurality of resources is randomly selected from the resources specified in the resources list;
receive a user input selecting an online application; and
in response to the user input selecting the online application, load respective downloaded resources that correspond to the selected online application.

* * * * *